United States Patent [19]
Bessiere et al.

[11] Patent Number: 5,947,418
[45] Date of Patent: Sep. 7, 1999

[54] DEVICE FOR HEATING AN AEROFOIL

[75] Inventors: Robert Bessiere, Marignane; Jean-Cyril Bauchet, Montgeron, both of France

[73] Assignee: Eurocopter, Marignane Cedex, France

[21] Appl. No.: 08/978,045

[22] Filed: Nov. 25, 1997

[30] Foreign Application Priority Data

Nov. 27, 1996 [FR] France ................................. 9614528

[51] Int. Cl.⁶ .......................... B64D 15/12; B64D 15/14
[52] U.S. Cl. .................................. 244/134 D; 244/134 R; 219/545
[58] Field of Search ...................... 244/134 D, 134 R, 244/134 F; 219/202, 548, 535, 520, 542, 552, 545

[56] References Cited

U.S. PATENT DOCUMENTS

| | | | |
|---|---|---|---|
| 1,703,005 | 2/1929 | Hewitt | 219/545 |
| 2,686,640 | 8/1954 | Neel, Jr. et al. | 244/134 D |
| 2,932,719 | 4/1960 | Godden | 244/134 R |
| 3,183,975 | 5/1965 | Keen . | |
| 3,420,476 | 1/1969 | Volkner et al. | 244/134 D |
| 4,737,618 | 4/1988 | Barbier . | |
| 4,814,931 | 3/1989 | Kugelman et al. | 244/134 D |
| 5,351,918 | 10/1994 | Giamati et al. | 244/134 D |
| 5,657,951 | 8/1997 | Giamati | 244/134 D |

FOREIGN PATENT DOCUMENTS

| | | | |
|---|---|---|---|
| 1272136 | 7/1968 | Germany | 244/134 D |
| 2443224 | 3/1976 | Germany | 244/134 D |
| 1053734 | 1/1967 | United Kingdom | 244/134 F |
| 2 291 575 | 1/1996 | United Kingdom . | |

*Primary Examiner*—Charles T. Jordan
*Assistant Examiner*—Patricia L. Zuniga
*Attorney, Agent, or Firm*—Henderson & Sturm

[57] ABSTRACT

A number of resistive elements are incorporated into the aerofoil in the vicinity of its leading edge. Each of the resistive elements is electrically connected to the other resistive elements at its distal end and is fitted at its proximal end with means of connection to an electrical power supply. The resistive elements are split between a first set that includes at least two resistive elements and a second set that includes at least one resistive element. In service, the resistive of the first set are powered in turn, while each resistive element of the second set acts as a return path for the electricity and is powered continuously or almost continuously.

10 Claims, 5 Drawing Sheets

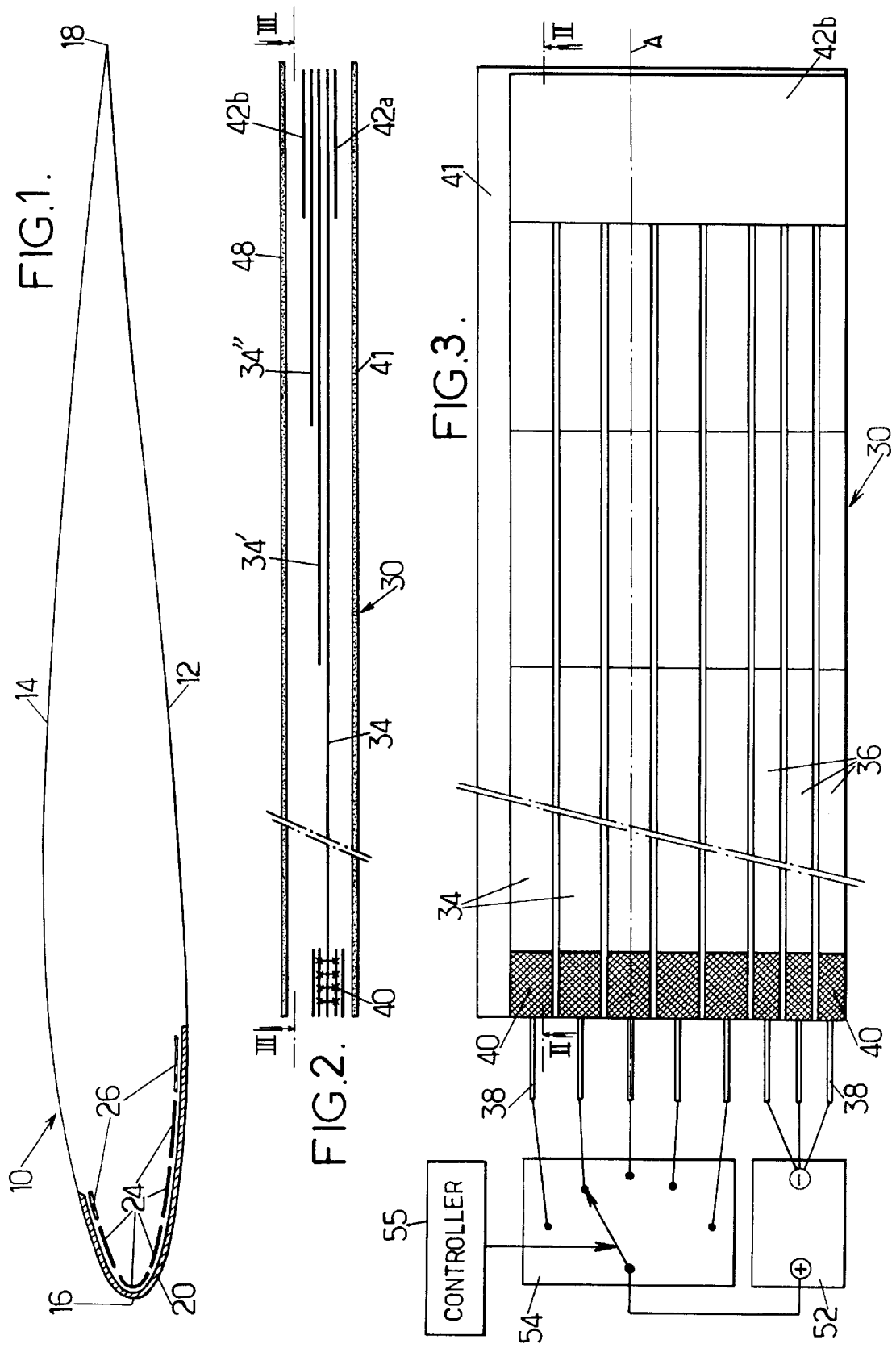

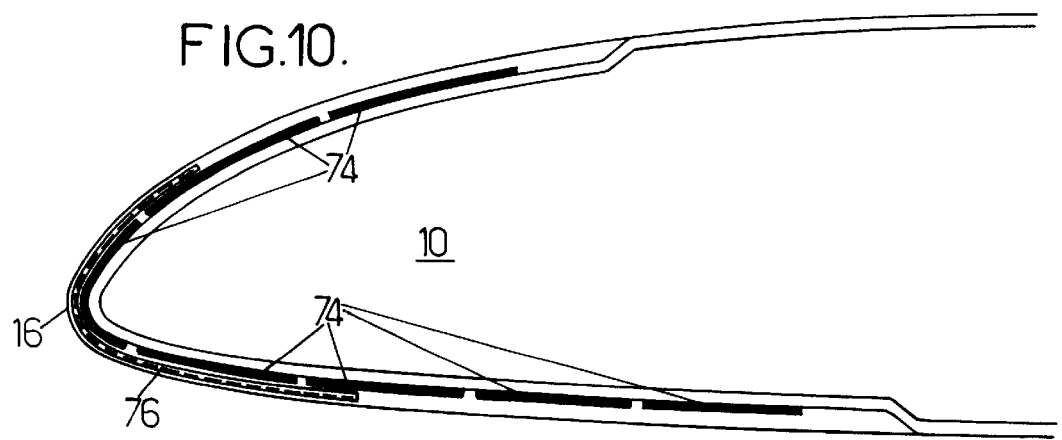
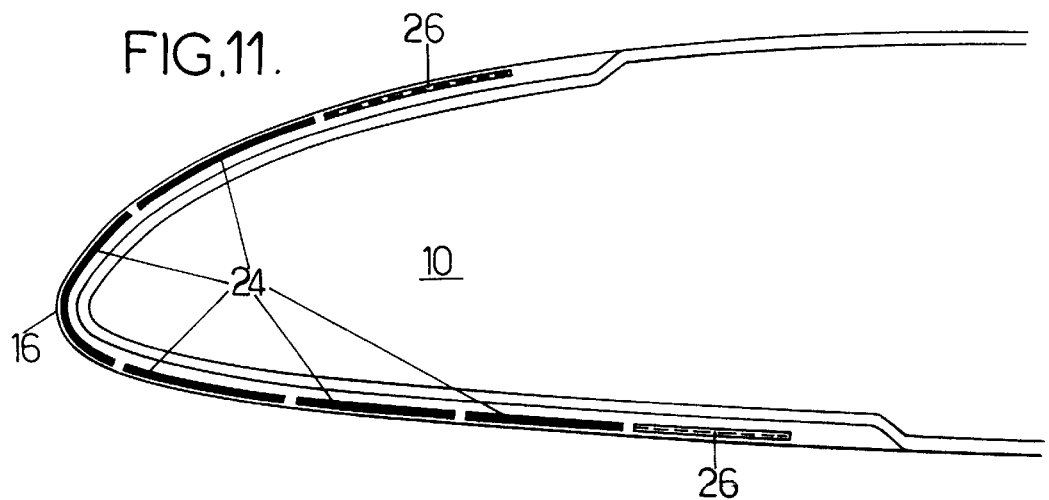
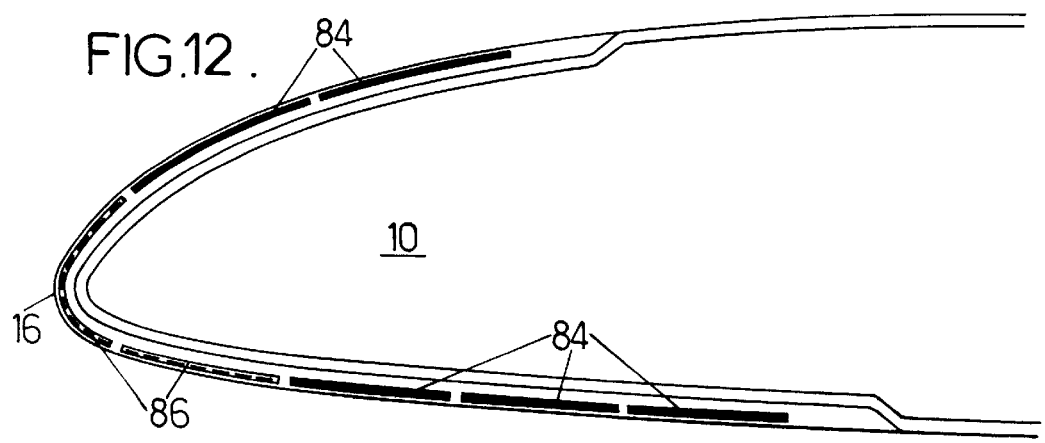

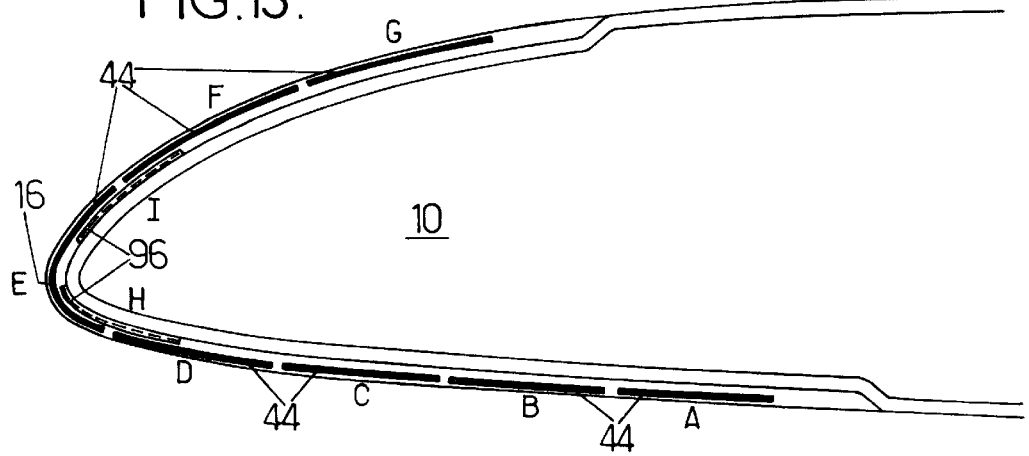
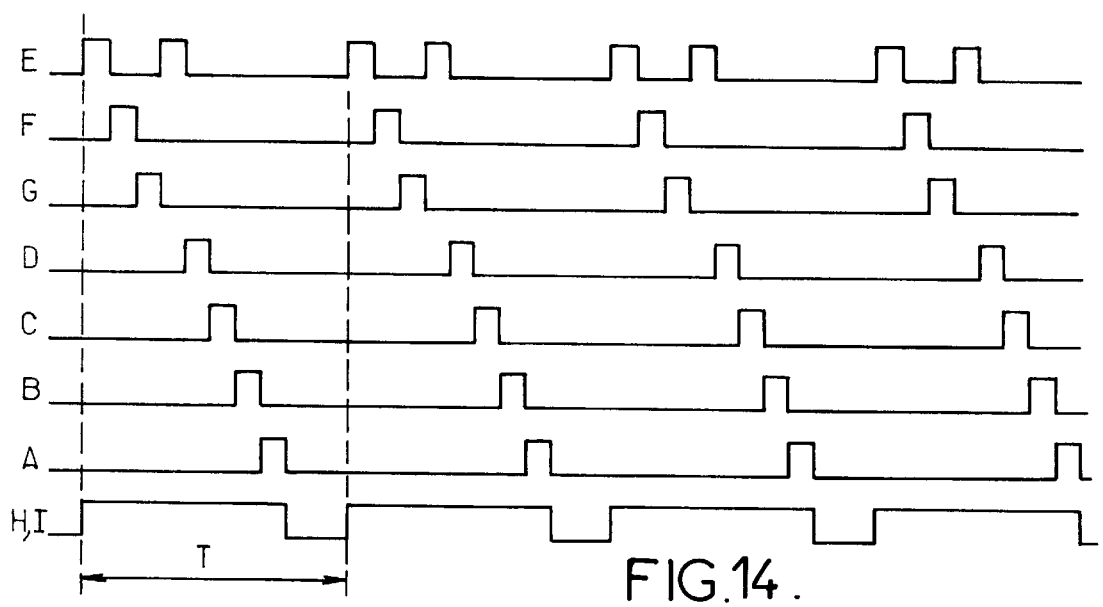
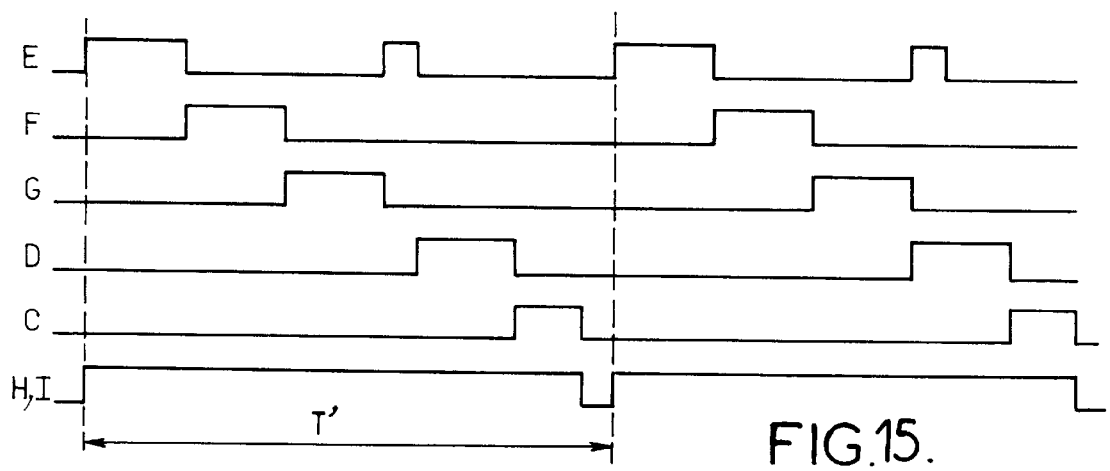

DEVICE FOR HEATING AN AEROFOIL

TECHNICAL FIELD

The present invention relates to a device for heating an aerofoil. The aerofoils concerned are generally those whose aerodynamic shape must not be disturbed by the formation of ice, especially helicopter blades (for the main rotor or the counter-torque rotor), or alternatively airplane wings, etc.

BACKGROUND OF THE INVENTION

The problem of icing on aerofoils is well known in the aeronautics industry. The shape of the aerofoils may be altered on account of the formation of ice that occurs because during flight, the aerofoil encounters droplets of supercooled water contained in the atmosphere.

This problem is often dealt with by equipping the aerofoil with a Joule-effect heating structure.

Usually, the heating structure consists of metal resistors. These metal resistors pose problems of mechanical integrity, particularly for aerofoils that are made of composite material, of tolerance to damage (multiple redundancy is needed to ensure that the breakage of one metal resistor does not prevent the entire device from functioning), of uniform heating per unit area, and of corrosion.

In order to limit the occurrence of these problems, it has been proposed that use be made of a composite deicer in which the resistive elements are composed of carbon fibers (see French Patent 2 578 377).

A distinction is made between "deicers", in which the resistive elements that dissipate heat are powered intermittently to remove the ice that regularly forms, and "anti-icing devices", in which the resistive elements are powered continuously to prevent ice from forming.

It will be understood that as regards the effectiveness of the fight against ice, the anti-icing device, which has a preventive action is preferable to the deicer, which has a curative action. However, the anti-icer has the drawback of consuming a great deal of electrical power when a large aerodynamic surface needs to be kept at a high enough temperature to prevent the formation of ice. Thus, the principle of anti-icing devices is often reserved for relatively small areas. For larger areas, the deicer provides a compromise between electrical power consumption and effectiveness of the heating. In general, it is enough for the deicer to be able to melt some of the ice, the rest being torn off by centrifugal force or the aerodynamic flow.

In the case of medium or heavy helicopters, a design often adopted consists in fitting the blades of the counter-torque rotor with anti-icing devices and the blades of the main rotor with deicers. These deicers all use the principle of heating resistors arranged along the span of the blade with return paths for the electrical current so as to return the electrical current from the tip to the root of the blade. Whatever their means of electrical supply (3-phase or rectified DC current) and however the heating resistors are produced (metal, carbon fibers, etc), today's deicers use either braids or strips or cables of very low electrical resistance (a few mW) as their return path. This low resistance is obtained by selecting materials with very low resistivity (tinned copper, brass, $r=8\times10^{-6}$ W.cm). This is because the requirement is for these current return paths to avoid dissipating heat energy so that all of the power is available for the heating resistors. The major drawback of these return paths results from the poor fatigue properties of the materials of which they are made, which restrict the life and lower the reliability of the complete deicer.

SUMMARY OF THE INVENTION

An object of the present invention is to propose a design of a heating device that makes it possible to get around some of the limitations of the known deicers and which, particularly as regards relatively large aerofoils, can give a good compromise between the effectiveness of the heating and the electrical power consumption.

The invention thus proposes a device for heating an aerofoil comprising, incorporated into the aerofoil in the vicinity of a leading edge of the aerofoil, a number of resistive elements which are more or less parallel to the leading edge, each of said resistive elements being fitted at its proximal end with means of connection to an electrical power supply, and the distal ends of the resistive elements being connected electrically to one another. Said resistive elements are split between a first set including at least two resistive elements and a second set including at least one resistive element. The device also comprises control means for the cyclic application of power to at least some of the resistive elements of the first set one after another in a determined sequence. The electric current flowing through any one of the resistive elements of the first set flows in the opposite direction through the resistive element of the second set, or, if the second set contains a number of elements, in parallel through the resistive elements of the second set.

Thus, the layout of the resistive elements allows both directions of flow of the current to play a part in the heating by Joule effect. The resistive elements of the first set are powered intermittently and cyclically, and therefore act as a deicer. The resistive element(s) of the second set provide the electrical return path and are constantly powered, or at least powered with an appreciably higher duty ratio, when the device is in operation, which means that they operate like an anti-icing device.

Depending on the number and relative values of the resistances of the elements of the first and second sets, preference can be given either to the anti-icing function or to the deicing function, and this gives a great deal of flexibility in seeking, in each individual case, the best compromise between effectiveness and power consumption.

In some cases, it might be possible to form an actual anti-icing device over part of the aerofoil, for example the part closest to the leading edge, and to provide around this anti-iced part a border which would merely be deiced. The invention thus allows a deicing function to be associated with a device of the anti-icing type.

In other cases, it will be the deicing function which will be predominant, the elements of the second set providing local anti-icing, or being superposed with those of the first set to reduce the amount of thermal energy required for each deicing cycle or to prevent the presence of cold spots.

The layout of the device according to the invention gives a great deal of freedom in adjusting the distribution of thermal power per unit area in the vicinity of the leading edge. Thus, when the resistive elements are arranged one beside the other in a heating mat covering the vicinity of the leading edge, one or more resistive elements of the second set can be placed along a lateral edge of the heating mat or along two opposed lateral edges. This makes it possible to obtain lower heating power in the parts furthest from the leading edge, in which parts the need for heating is less.

Another possibility is that of arranging the resistive elements of the first set one beside the other in a heating mat covering the vicinity of the leading edge, and of arranging one or more resistive elements of the second set as an increase in thickness over part of the width of the heating mat lying at the leading edge. The latter solution leads to the immediate vicinity of the leading edge being heated more. It is even possible to envisage completely preventing the formation of ice in this immediate vicinity of the leading edge.

It is also possible to arrange one or more resistive elements of the second set in such a way that they cover over the gaps between the resistive elements of the first set, so as to avoid the formation of cold spots in these gaps.

When the resistive elements are not highly mechanically stressed, that is to say when the blade is not subject to much vibrational fatigue stress, the elements may be made of metal. The thickness of these elements is then advantageously small, and they are easy to incorporate into the blade.

When the blade is subject to high fatigue stresses, the resistive elements of both sets preferably each consist of conducting fibers, typically made of carbon, running parallel to the leading edge of the aerofoil. This way of producing the deicer/anti-icing device on the basis of carbon fibers or the like, has a number of advantages:

- a major advantage relates to its mechanical integrity, and therefore to its durability. This mechanical strength is obtained by using composite materials based on carbon fiber, of which the static and fatigue-strength properties under the strains experienced during flight can be very high. This property makes it possible to provide deicers/anti-icing devices whose life is compatible with that of the structure of the blade;
- in addition, each resistive element is a layer consisting of multiple carbon filaments, all conductors of current and thus giving multiple redundancy in the event of breakage of one of the filaments;
- the composite/composite bond between the carbon-fiber-based device and the blade is therefore of high quality over time;
- the carbon fibers of the resistive elements play a part in stiffening the blade. As these fibers are very close to the leading edge, their contribution to drag stiffness (proportional to the square of the distance from the neutral axis) is particularly high. It makes it possible to lighten, or even do away with, the trailing edge ledge generally needed to take up some of the drag loading, but which has the drawback of increasing the mass of the blade and moving its center of gravity back;
- the carbon-fiber-based device heats more uniformly over its entire area;
- the structure of the composite deicer is flexible before polymerization and can therefore be shaped and laid up over broad surfaces which are uneven and have complicated shape. On the other hand, it becomes stiff and solid after polymerization (which is an advantage for handling, ease of laying-up, reduced risk of defect, increased quality, etc);
- the risk of corrosion is eliminated or at least reduced.

BRIEF DESCRIPTION OF THE DRAWINGS

Other specific features and advantages of the present invention will become clear from the description hereafter of non-limiting embodiments with reference to the appended drawings, in which;

FIG. 1 is a diagrammatic sectional view of an aerofoil equipped with a device according to the invention;

FIG. 2 shows a longitudinal section through a heating mat forming part of a device according to the invention, the section being on the plane II—II marked in FIG. 3;

FIG. 3 is a laid-out view of the heating mat of FIG. 2 on the plane III—III marked in FIG. 2, with a diagrammatic depiction of the associated power-supply and control means;

FIGS. 7 to 13 are diagrammatic views in cross section showing the leading edge of an aerofoil equipped with other embodiments of the invention; and FIGS. 14 and 15 show timing diagrams illustrating examples of the cycle of the application of power to the resistive elements in a device like the one in FIG. 13.

DETAILED DESCRIPTION OF THE PREFERRED EMBODIMENTS

Figure 4:
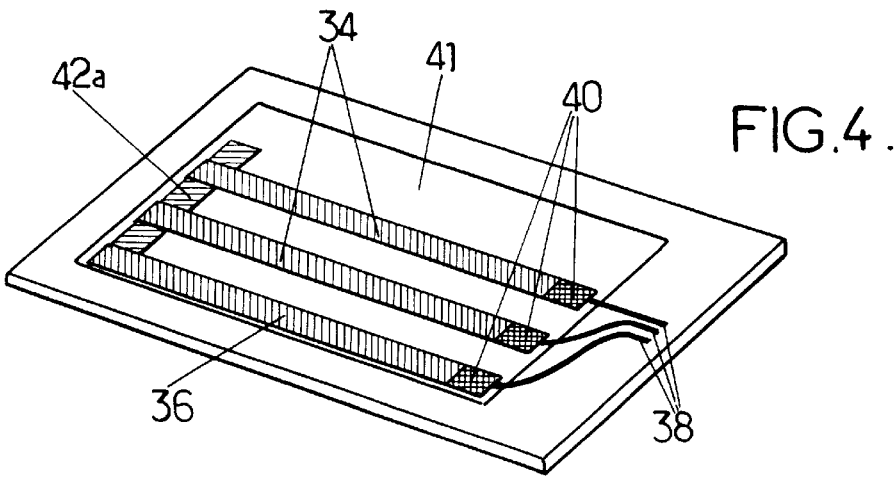
FIGS. 4 to 6 are perspective diagrams illustrating the production of a heating mat.

FIG. 1 shows diagrammatically in cross section an aerofoil 10 which consists of a helicopter blade, for example a main rotor blade. The numerical references 12, 14, 16 and 18 denote the pressure face, the suction face, the leading edge and the trailing edge of the blade 10, respectively.

The blade is made of composite material, and the vicinity of its leading edge 16 is covered with metal armoring 20 to protect it from impact. Immediately behind the armoring 20 there is a heating mat made of composite material. This heating mat contains a number of resistive elements 24, 26 consisting of layers of conducting (carbon) fibers running longitudinally along the span of the blade, that is to say parallel to the leading edge 16.

FIGS. 2 and 3 show an example of a heating mat 30 that can be used in a device according to the invention. The carbon resistive elements 34, 36 run along most (for example 76%) of the span of the blade. At its proximal end (toward the rotor hub), each resistive element 34, 36 is connected to a power supply lead 38 by means of a sheath 40 in the form of a metal mesh. The sheath 40 surrounds the proximal end of the carbon resistive element over a length of about 50 mm for example, and it entraps the lead 38 to ensure electrical contact. At their distal ends, the resistive elements 34, 36 are in electrical contact with one another. For this purpose, layers of carbon conducting fibers 42a, 42b running transversely to the leading edge are in contact with the distal ends of the resistive elements 34, 36.

Figure 5:
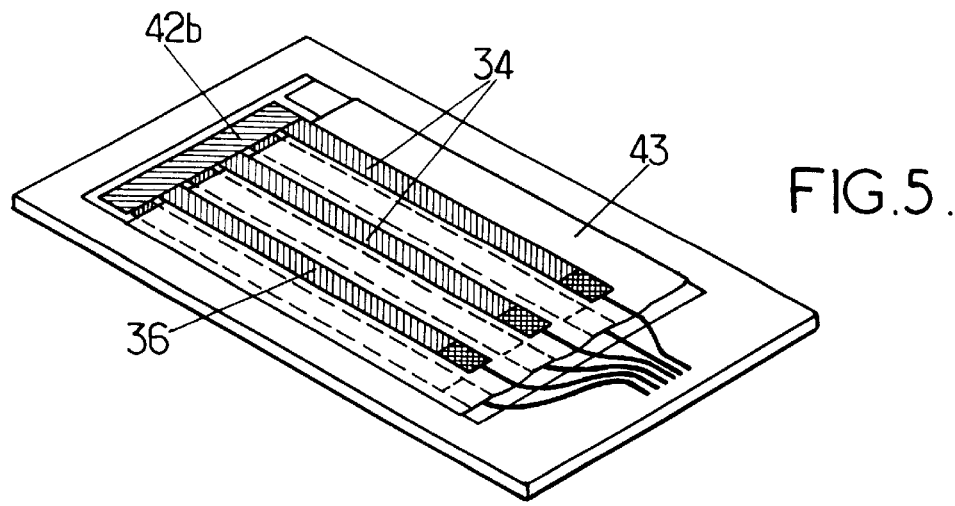
Figure 6:
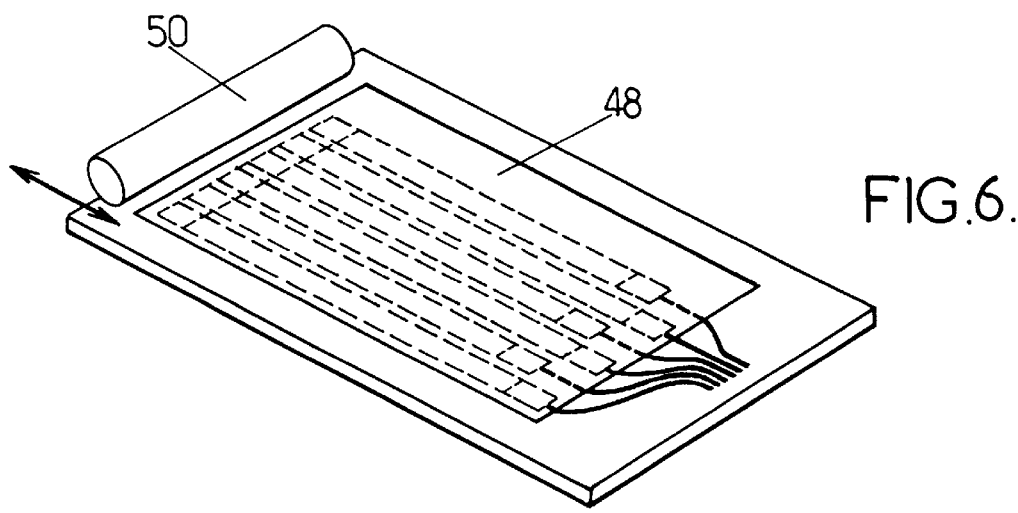

The heating mat is, for example, produced flat using the method described in French patent 2 578 377. FIGS. 4 to 6 illustrate successive stages in the production of this mat. In a first stage, a lower skin 41 of the mat, which skin consists, for example, of two layers of fiberglass fabric oriented at 45° to each other, is placed on a support. The layer of transverse fibers 42a is then placed at the distal end of the mat, followed by half of the longitudinal resistive elements 34, 36 (every second element along the width of the mat). The layers forming these resistive elements may be dispensed from reels of carbon fibers. With reference to FIG. 2, each resistive element is composed, for example, of nine layers of carbon fibers supplemented by a tenth layer 34' and an eleventh layer 34" toward the distal end so as to obtain lower local resistance and therefore less dissipation of heat toward the distal end of the blade where the risks of icing are lowest in the particular case under consideration (the variation in dissipated power may, in some instances, be the reverse). Once the layers of carbon fibers that form the elements 34, 36 have been paid out, the proximal end of each of these elements is fitted with its flexible metal sheath 40 and with its power supply lead 38. The mat is then in the state depicted in FIG. 4.

The mat is then covered (except for its distal end) with an insert insulating wad 43, not depicted in FIGS. 2 and 3 but visible in FIG. 5. This wad 43 may consist of several superposed layers of fiberglass fabric which isolate the resistive elements from one another and hold them in position. The remaining resistive elements 34, 36 are then placed, equipping them with their respective sheaths and their respective power supply leads. Once the other layer of transverse conducting fibers 42b has been positioned, the mat is in the state depicted in FIG. 5.

To complete the assembly of the heating mat, the upper skin 48, which has an identical construction to the lower skin 41 is put in place. A compacting roll 50 is then passed over the assembled mat in order to give it a certain amount of mechanical integrity (the fiberglass fabrics 41, 43, 48 are pre-impregnated with resin) and to ensure good electrical contact between the metal sheaths 40 and the corresponding resistive elements (FIG. 6).

In order to shape the mat thus pre-compacted, there are two options available. The first option consists in shaping the mat over a former which mimics the shape near the leading edge, and in polymerizing the resin on this former, possibly with the armoring 20. The component thus obtained can then be bonded to the blade made separately. The second option consists in polymerizing the resin directly during molding of the blade, in the same mold.

To reduce the electrical resistance of the layers of transverse fibers situated at the distal end, it may be necessary to increase their overall thickness. In this case, it is a good idea to provide more than two layers 42a, 42b and to sandwich some of these layers between layers of longitudinal fibers of the resistive elements. This operation does not present any difficulty. The carbon fibers need merely to be paid out in the appropriate order.

In accordance with the invention, the resistive elements of the heating mat are split into two sets. The first set is composed of the N resistive elements denoted 34 (N≧2) used for the flow of heating current in one direction, for example from the blade root toward the distal end. The second set comprises the M resistive elements denoted 36 (M≧1) for the flow of current in the other direction. The power supply leads 38 for the resistive elements 36 are thus connected collectively to one of the terminals of the electrical power supply 52 of the aircraft (FIG. 3).

The resistive elements 34 of the first set are powered cyclically in turn from the other power supply terminal 52. This distribution of power is depicted diagrammatically by the rotary switch 54 in FIG. 3. The rotary switch 54 is controlled by a deicing controller 55 which may be a processor programmed to apply predetermined heating cycles. These cycles define the sequences in which the elements 34 of the first set are powered, the elements 36 of the second set being used collectively, in parallel, as a return path for the electricity to the power supply 52. This power supply 52 may be a DC power supply or a single- or multi-phase AC supply. When programming the controller 55, a number of different heating cycles may be provided which, in service, can be selected by a manual control from the pilot or alternatively in accordance with the measurement of parameters such as external temperature. The means of controlling the power supply may of course be supplemented by power-regulation members, not depicted. In the conventional way, the connections between the leads 38 mounted on the blade and the power supply on board the aircraft are produced by means of rotating contacts which have not been depicted.

The resistive elements 34 are thus powered intermittently to provide a deicing-type function, while the resistive elements 36 are powered continuously (when the device is switched on) to give a function of the anti-icing device type. The electrical return paths play a part in supplying heat near the leading edge.

The way in which the resistive elements are powered allows various distributions of power per unit heated area. If each resistive element of the first set has a resistance R and if each resistive element of the second set has a resistance R', the resistance of the out and back current-circulation path is R+R'/M, neglecting the resistance of the transverse fibers 42a, 42b. The power dissipated on the outward leg (first set) is $P=U^2 \cdot R/(R+R'/M)^2$, where U denotes the power supply voltage. The power dissipated on the return leg (second set) is $P \cdot (R'/MR)$. It is of course possible for the resistance R not to be the same for all of the elements of the first set and/or for the resistance R' not to be the same for all of the elements of the second set.

In the example illustrated in FIG. 3, the electrical connections of the resistive elements 34, 36 at their distal ends are direct, by means of the transverse layers 42a, 42b. In other embodiments, it could be envisaged for some of these connections to be indirect, for example passing via other resistors. In the example of deicing the main section of a helicopter main rotor blade, if another heating mat is provided for deicing the tip of the blade, it is possible to mount each resistive element of this tip heating mat in series between, on the one hand, one or more elements of the first set and, on the other hand, one or more elements of the second set.

In the example depicted in FIG. 3, that part of the heating mat 30 that lies above the chain line A identifying the position of the leading edge is intended to cover the suction face of the blade (for example over 15% of the cord), while that part that lies below the line A is intended to cover the pressure face of the blade (for example over 23% of the cord). The first set contains N=5 resistive elements 34 having, for example, a width of 31 mm each. The second set contains M=3 resistive elements 36 having, for example, a width of 19 mm each, lying along the lateral edge of the heating mat 30 corresponding to the pressure face side.

In the example depicted in FIG. 1, the resistive elements 24, 26 are also situated one beside the other in the heating mat. The first set contains N=5 resistive elements 24. The second set contains M=2 resistive elements 26, one of which lies on the lateral edge of the mat on the suction face side and the other of which lies on the opposite lateral edge of the mat, on the pressure face side.

Other possible layouts of the heating device are shown diagrammatically in FIGS. 7 to 13, where the thick lines represent the cyclically powered resistive elements 44, 74, 24, 84 of the first set, while the broken lines are used to denote the elements 46, 56, 66, 76, 26, 86, 96 of the second set which act as an electrical return path, the metal armoring of the leading edge 16 not being depicted.

Figure 7:
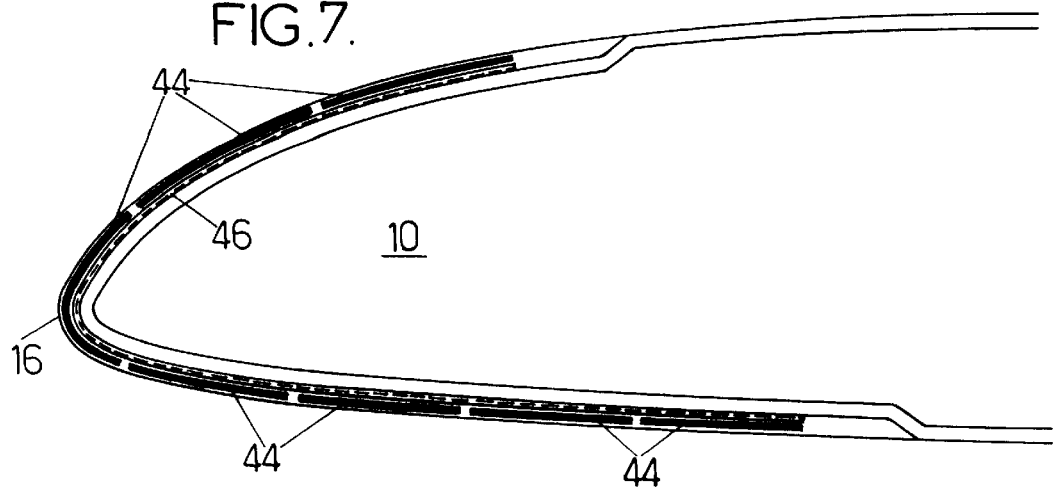

In the embodiment depicted in FIG. 7, the N=7 resistive elements 44 of the first set lie one beside the other in the heating mat covering the vicinity of the leading edge 16. The second set contains M=1 resistive element 46 placed as an increase in thickness over the entire width of the mat. The element 46 which is powered continuously or almost continuously like an anti-icing device, provides the de-icing device which consists of the cyclically powered elements 44 of the first set with additional overall heating power and prevents regions of the de-icing device from becoming too cold between two powered periods.

Figure 8:
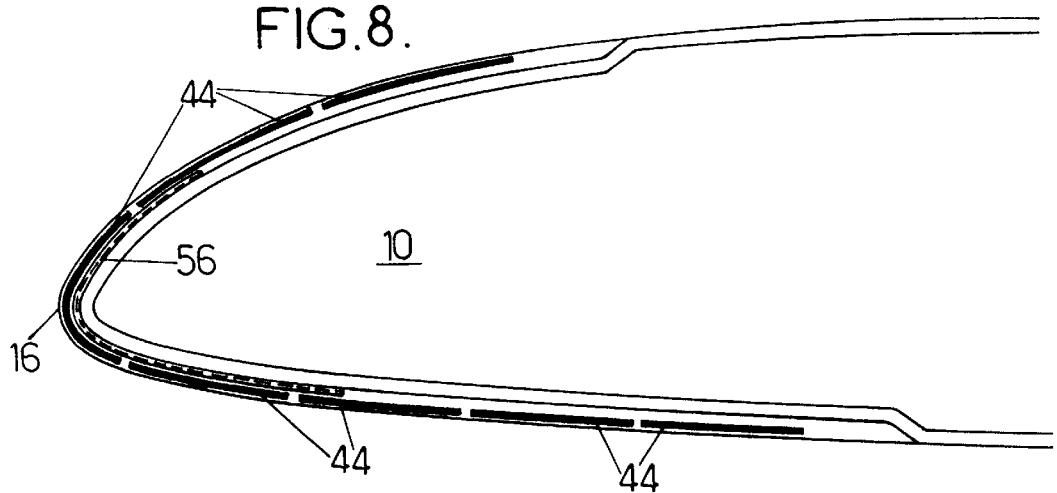

The example in FIG. 8 differs from the one in FIG. 7 in that the element 56 of the second set extends over just part of the width of the mat. This part of the width of the mat is the part that covers the region closest to the leading edge 16, so as to increase the heating in this region which is the region most exposed to ice.

Figure 9:
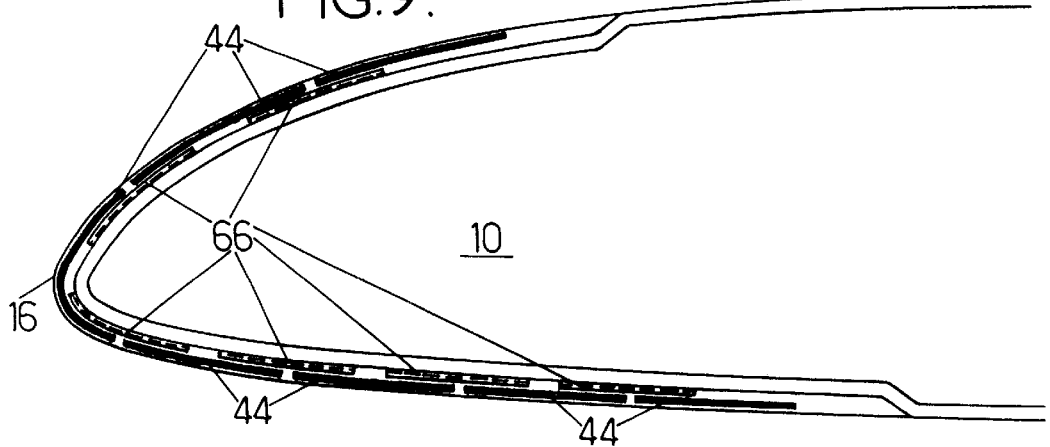

In the alternative embodiment shown in FIG. 9, the second set contains M=N−1=6 resistive elements 66 placed as an increase in thickness so that they cover the gaps between the adjacent elements 44 of the first set. By thus providing additional power in these gaps, the risk of cold spots forming here is reduced.

The embodiment of FIG. 10 is comparable with that of FIG. 8, but is rather more appropriate when it is anticipated that the anti-icing function will be relatively more important in terms of dissipated power. Parallel with the heating mat, the N=7 elements 74 of the first set and the M=1 element 76 of the second set have the same positions as in the case of FIG. 8, but the element 76 is situated on the outside of the mat relative to the elements 74, so that it can impart the heat it gives off to the metal armoring more directly.

In the examples of FIGS. 11 and 12, the elements of the two sets (N=5, M=2) are situated one beside the other (in the same plane when the mat is laid out flat). The example of FIG. 11 is comparable with the one already depicted diagrammatically in FIG. 1, the two elements 26 of the second set producing additional power on the lateral edges of the mat which mainly provides deicing by means of the five elements 24 of the first set.

In the case of FIG. 12, the two elements 86 of the second set have a resistance which is proportionately greater than that of the five elements 84 of the first set, which means that the anti-icing function is of greater importance than was the case in FIG. 11. The elements 86 of the second set are therefore the closest to the leading edge 16, so that most of the power can be dissipated here, this anti-icing device being supplemented, on its lateral edges, by a deicer consisting of the elements 84 of the first set.

FIG. 13 shows another configuration of a device according to the invention. The N=7 elements 44 of the first set are placed like in the case of FIGS. 7 to 9, and are identified by the letters A to G from the pressure face side toward the suction face side of the blade, the element E being situated at the leading edge 16. The second set contains M=2 elements 96 placed as an increase in thickness on the inside of the heating mat. One of these elements, denoted H, covers the gap between the elements D and E, while the other, denoted I, covers the gap between the elements E and F.

By way of example, the resistive elements may be powered by a DC voltage of 270 V split into 190 V for the elements 44 of the first set dissipating of the order of 5.4 kW, and 80 V for the elements 96 of the second set dissipating of the order of 2.2 kW. Examples of power supply cycles are shown by way of illustration in FIGS. 14 and 15. The cycle in FIG. 14 may be appropriate for external temperatures which are not too low, for example from 0 to −10° C. The resistive elements 44 of the first set are powered in the order EFGEDCBA, so that each is powered for 8 seconds (except the element E which is powered for 15 seconds) in each cycle. The duration T of the cycle may vary in accordance with the outside temperature. The cycle in FIG. 15 is rather more appropriate for low temperatures (for example from −20 to −30° C.) for which it is important to concentrate the power into the regions closest to the leading edge. The elements A and B furthest from the leading edge are not powered, the others being powered in the order EFGEDC so that the element E is powered for 40 seconds, the elements D, F and G for 30 seconds, and the element C for 20 seconds in a cycle the duration T' of which can also vary.

In the examples of FIGS. 14 and 15, the deicers of the various blades of the rotor are powered synchronously, in parallel, which simplifies the connections. It is also envisageable to provide one or more modes of operation in which the deicers of the various blades might be powered in turn.

Of course, the resistive elements of the heating mats of the examples described earlier with reference to the Figures may be made of metal for this applications used in blades which are not highly stressed.

We claim:

1. A device for heating an aerofoil comprising, incorporated into the aerofoil in the vicinity of a leading edge of the aerofoil, a number of resistive elements which are more or less parallel to the leading edge, each of said resistive elements being fitted at its proximal end with means of connection to an electrical power supply, and the distal ends of the resistive elements being connected electrically to one another, wherein said resistive elements are split between a first set including at least two resistive elements and a second set including at least one resistive element, wherein the device also comprises control means for the cyclic application of power to at least some of the resistive elements of the first set one after another in a determined sequence, and wherein the electric current flowing through any one of the resistive elements of the first set flows in the opposite direction through the resistive element of the second set, or flows in parallel through the resistive elements of the second set.

2. The device as claimed in claim 1, wherein the resistive elements are arranged one beside the other in a heating mat that covers the vicinity of the leading edge, at least one resistive element of the second set lying along a lateral edge of the heating mat.

3. The device as claimed in claim 2, wherein the second set contains at least one resistive element lying along a lateral edge of the heating mat and at least one resistive element lying along the opposite lateral edge of the heating mat.

4. The device as claimed in claim 1, wherein the resistive elements are arranged one beside the other in a heating mat covering the vicinity of the leading edge, at least one element of the second set lying closer to the leading edge than the elements of the first set.

5. The device as claimed in claim 1, wherein the resistive elements of the first set are arranged one beside the other in a heating mat covering the vicinity of the leading edge, and wherein at least one resistive element of the second set is arranged as an increase in thickness with respect to the elements in the first set in the heating mat.

6. The device as claimed in claim 5, wherein said second set is composed of the resistive element that more or less covers the entire width of the heating mat.

7. The device as claimed in claim 5, wherein at least one resistive element of the second set lies over part of the width of the heating mat which is at the leading edge.

8. The device as claimed in claim 5, wherein at least one resistive element of the second set is placed in such a way that it covers a gap between two adjacent resistive elements of the first set.

9. The device as claimed in claim 1, wherein the resistive elements each consist of layers of electrically conducting fibers more or less parallel to the leading edge of the aerofoil.

10. The device as claimed in claim 9, wherein the resistive elements are in contact at their distal ends with at least one layer of conducting fibers running transversely to the leading edge.

* * * * *